United States Patent
Nohira (10) Patent No.: US 7,121,094 B2
(45) Date of Patent: Oct. 17, 2006

(54) CENTER VALVE FOR MASTER CYLINDER

(75) Inventor: Shigemitsu Nohira, Toyota (JP)

(73) Assignee: Advics Co., Ltd., Aichi (JP)

( * ) Notice: Subject to any disclaimer, the term of this patent is extended or adjusted under 35 U.S.C. 154(b) by 31 days.

(21) Appl. No.: 10/935,441

(22) Filed: Sep. 8, 2004

(65) Prior Publication Data

US 2005/0103011 A1    May 19, 2005

(30) Foreign Application Priority Data

Sep. 10, 2003  (JP)  ............................. 2003-318137

(51) Int. Cl.
*B60T 11/232* (2006.01)
*F15B 7/10* (2006.01)

(52) U.S. Cl. ......................................................... 60/589
(58) Field of Classification Search .................... 60/589
See application file for complete search history.

(56) References Cited

U.S. PATENT DOCUMENTS 5,473,896 A    12/1995  Bergelin et al.

FOREIGN PATENT DOCUMENTS

| DE | 39 32 248 A1 | 4/1990 |
|---|---|---|
| JP | 2002-302029 | 10/2002 |

*Primary Examiner*—F. Daniel Lopez
(74) *Attorney, Agent, or Firm*—Buchanan Ingersoll & Rooney PC (57) ABSTRACT

A center valve for a master cylinder includes a valve body and a valve seat fitted in a valve casing. The valve seat has an elastic tube fitted on a core member. The elastic tube has a front end portion adapted to be pressed against the rear end face of the valve body, and a rear cylindrical portion. A gap is provided behind the cylindrical portion of the elastic tube. When the front end of the elastic tube is deformed, the cylindrical portion of the tube is also deformed in such a way as to fill or protrude into the gap. Because the rear cylindrical portion is also deformed, the degree of deformation of the front end is suppressed. This prevents the front end of the tube from getting trapped between the valve body and the core member of the valve seat and thus getting torn.

6 Claims, 7 Drawing Sheets

PRIOR ART

Fig.10

PRIOR ART

Fig. 11

PRIOR ART

Fig. 12

PRIOR ART

CENTER VALVE FOR MASTER CYLINDER

BACKGROUND OF THE INVENTION

This invention relates to a center valve for a master cylinder used as a hydraulic pressure source for a vehicle hydraulic brake system or a hydraulic clutch.

Figure 1:
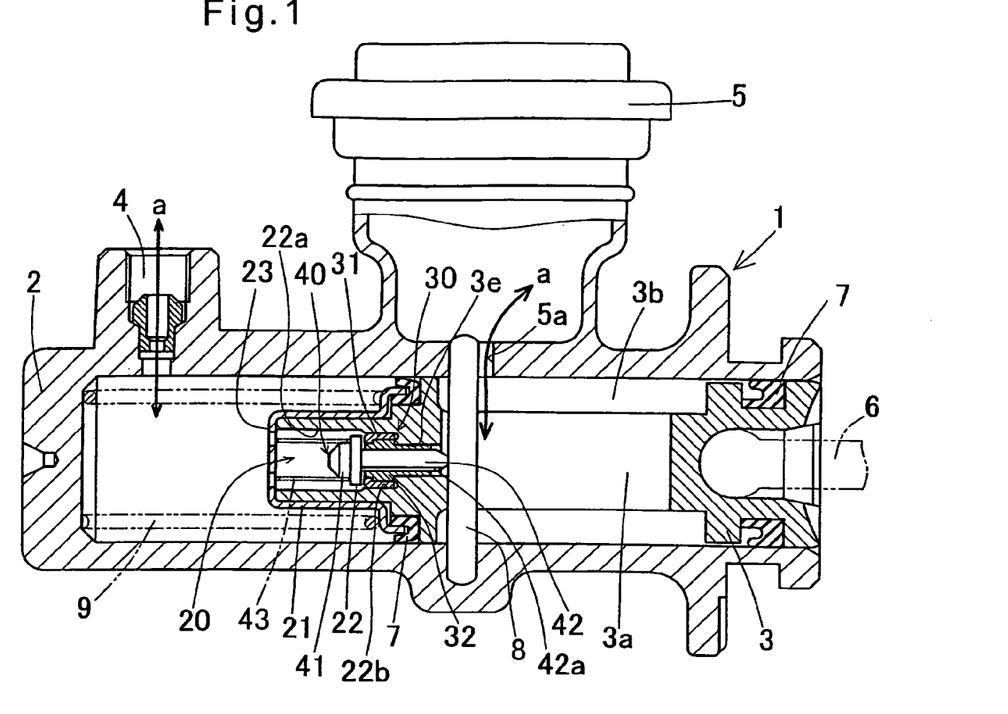
FIG. 1 is a partially cutaway front view of a first embodiment of the present invention.

FIG. 1 shows a master cylinder embodying the present invention. It includes a cylinder body 2 having a closed end. A piston 3 is inserted in the cylinder body 2 so as to be movable in the axial direction of the cylinder body 2. The cylinder body 2 has a port 4 through which the interior of the cylinder body 2 communicates with hydraulic units such as hydraulic pressure control modules. The cylinder body 2 carries a reservoir tank 5. The piston 3 carries a center valve 20 at the front (inner) end thereof. When a brake pedal, which is not shown and connected to the piston 3 through a pushrod 6, is depressed and released, the piston 3 moves forward (leftwardly in the figure) and backward. When the piston 3 moves leftwardly in the figure, the center valve 20 closes, thereby producing hydraulic pressure in the master cylinder pressure chamber. The hydraulic pressure produced in the master cylinder pressure chamber is supplied to wheel cylinders or hydraulic units. When the piston 3 moves rightwardly in the figure, the center valve 20 opens, allowing hydraulic fluid in the master cylinder pressure chamber to return to the reservoir tank 5.

Figure 9:
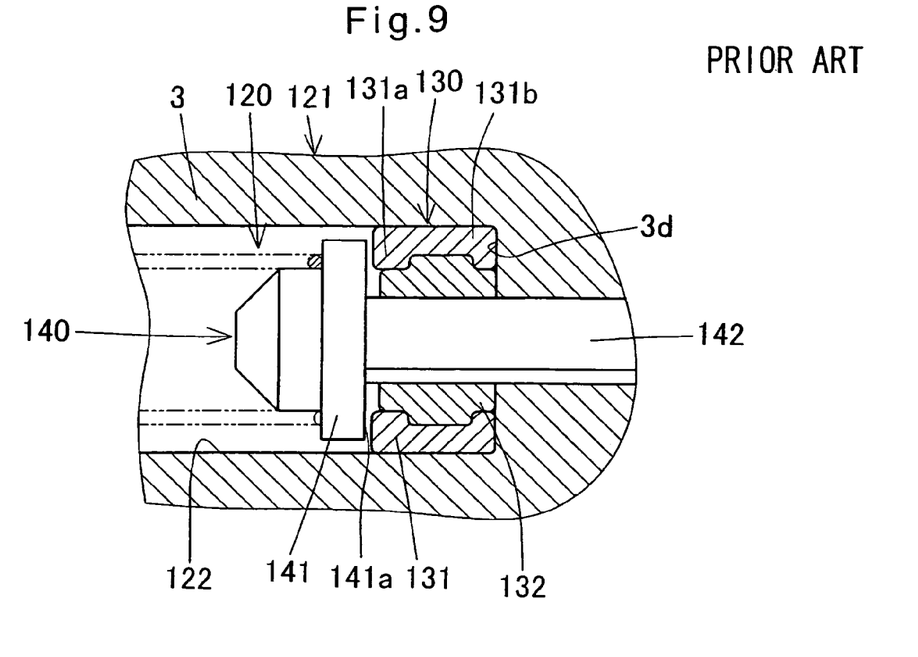
FIG. 9 is a partial sectional view of a conventional center valve.
Figure 10:
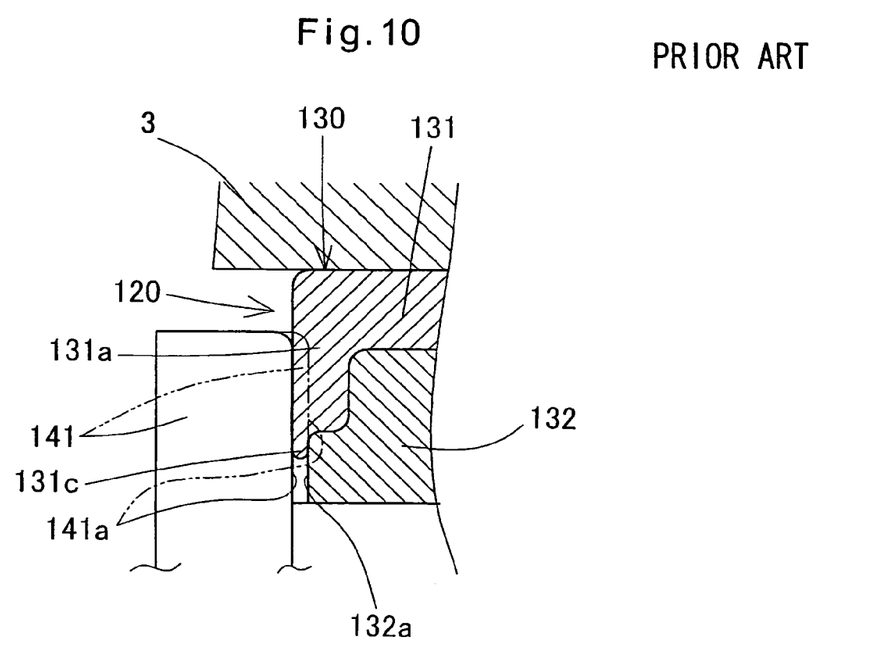
FIG. 10 is an enlarged view of a portion of FIG. 9, showing a different operational state.

FIGS. 9 and 10 show a conventional center valve 120 which corresponds to the valve 20 according to this invention. The valve 120 includes a valve casing 121 provided at the front end of the piston 3 and formed with a passage 122 for hydraulic fluid that extends in the axial direction of the cylinder body 2. A valve seat 130 and a valve body member 140 are mounted in the passage 122. The valve seat 130 is fitted in the passage 122 in abutment with its end wall, and comprises a core 132 and an elastic tube 131 fitted around the core 132. The tube 131 comprises a front end 131a adapted to be pressed against the rear end face 141a of a substantially truncated conical valve body 141 of the valve body member 140, and the remaining cylindrical body 131b. The valve body member 140 includes a shaft 142 extending through the core 132 of the valve seat 130 so as to be slidable in the axial direction of the cylinder body 2 relative to the core 132, and carrying the valve body 141 at its front end.

When the valve body 141 is pressed against the front end 131a of the elastic tube 131, the front end 131a tends to be pushed radially inwardly while being sandwiched between the front end of the core 132, which is made of a metal, and the rear end 141a of the valve body 141 as shown in FIG. 10. When the valve body 141 separates from the tube 131, the tube 131 elastically returns to the original position shown in FIG. 9. When this is repeated, the radially inner portion 131c of the front end 131a of the tube 131 tends to get torn or otherwise damaged. This of course greatly impairs sealability of the valve 120.

Even while the brake pedal is not being depressed and the piston 3 is in the initial position (position of FIG. 1), hydraulic pressure may be supplied into the pressure chamber from hydraulic units for e.g. vehicle stability control (VSC). This creates a pressure difference between the pressure chamber and the chamber communicating with the reservoir 5 through the port 5a. Due to this pressure difference, the front end 131a of the elastic tube 131 is pulled radially inwardly and pressed hard against the valve body 141. Thus, in this situation, too, the radially inner end 131c of the front end 131a of the elastic tube 131 tends to get torn by being repeatedly trapped between the front end face of the core 132 and the rear end face of the valve body 141.

Figure 11:
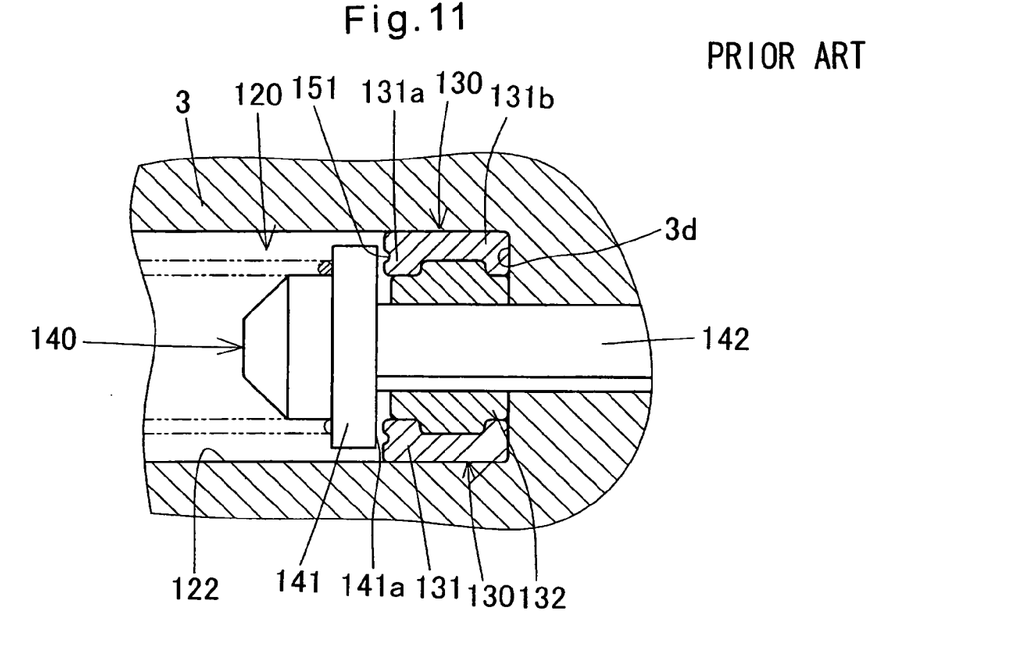
FIG. 11 is a partial sectional view of another conventional center valve.

To prevent the elastic tube 131 from getting torn, unexamined Japanese patent publication 2002-302029 proposes to form an annular groove 151 in the front surface of the radially inner portion of the front end of the tube 131 as shown in FIG. 11. When this portion of the tube 131 is pressed against the valve body 141, the groove 151 absorbs elastic deformation of the tube 131 as shown in FIG. 12, thereby preventing the tube from getting torn.

Figure 12:
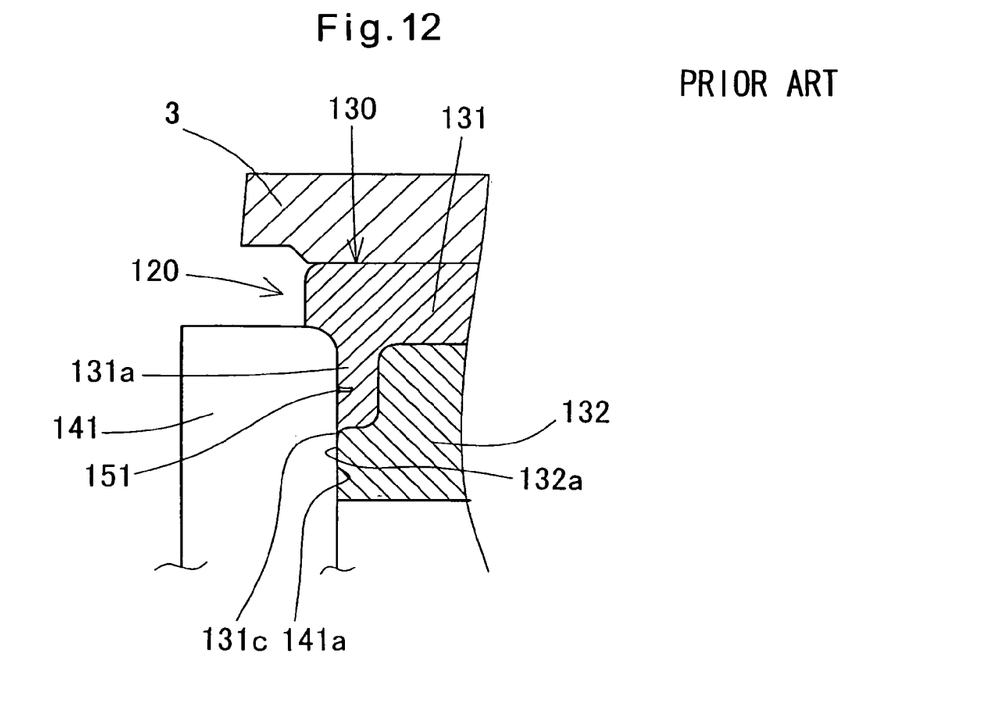
FIG. 12 is an enlarged view of a portion of FIG. 9, showing a different operational state.

But if FIG. 12 is compared with FIG. 10, it will be apparent that the annular groove 151 scarcely serves to reduce the amount of the radially inwardly stretched portion of the tube when the valve body is pressed against the valve seat or due to a pressure difference between the pressure chamber and the chamber communicating with the reservoir. Thus, the groove 151 cannot effectively prevent the radially inner portion of the front end of the elastic tube from getting torn. By increasing the size of the groove 151, it will be possible to lower the possibility of tearing of the elastic tube to some extent. But with increase in the size of the groove 151, the volume of the front end of the elastic tube will correspondingly decrease. This deteriorates sealability and durability. Thus, the size of the annular groove 151 is limited.

An object of the present invention is to provide a center valve of the abovementioned type which can effectively prevent the elastic tube from getting torn.

SUMMARY OF THE INVENTION

According to the present invention, a recess or a gap is provided in the rear cylindrical portion of the elastic tube or behind the elastic tube so that the rear cylindrical portion can fill or protrude into this recess or gap when it is elastically deformed. By providing such a gap or recess, when the front end of the elastic tube is elastically deformed under external force, the rear cylindrical portion is also deformed markedly in such a way as to fill or protrude into the gap or recess. Thus, the front end of the elastic tube is less deformed compared with the case where no such gap or recess is provided. The front end of the elastic tube is thus less likely to be sandwiched between the valve body and the core member of the valve seat and thus is less likely to get torn.

The cylindrical portion of the elastic tube serves to securely support the elastic tube on the core member of the valve seat, and has practically no sealing function. Thus, the recess or gap formed in the cylindrical portion of the elastic tube will have no bad influence on the sealing function of the elastic tube.

According to the specific aspect of the present invention, there is provided a center valve for use in a master cylinder including a cylinder body having a closed front end, and a piston slidably inserted in the cylinder body, the center valve comprising a valve casing formed at a front end of the piston and formed with a passage through which hydraulic fluid can flow, a valve seat fitted in the passage, and a valve body mounted in the passage in front of the valve seat so as to be movable in an axial direction of the passage, the valve seat comprising a core member and an elastic tube fitted on the radially outer surface of the core member, the elastic tube comprising a front end portion adapted to be pressed against the valve body, and a rear cylindrical portion having an axis parallel to the axis of the passage, the valve body and the valve seat being movable toward and away from each other, the center valve being provided with a gap behind the cylindrical portion of the elastic tube, whereby when the valve body is pressed against the valve seat, at least the rear end of the cylindrical portion is elastically deformed and protrude into the gap.

Instead of or in addition to such a gap, a gap may be formed in the cylindrical portion of the elastic tube itself. In other words, such a gap or gaps are provided such that when the front end of the elastic tube is deformed, the rear cylindrical portion is also deformed in such a way as to fill or protrude into the gap.

Preferably, the valve seat has an extension fitted in the passage to extend parallel to the axis of the passage, thereby holding the valve seat in position.

The extension serves to prevent the valve seat from being inserted into the passage with the wrong end first. Of course, it serves to more easily and reliably align the valve seat with the axis of the passage.

Preferably, the passage has a first portion in which the extension is received, and a second portion in which the valve seat is received, the extension having such a length that the extension is at least partially inserted in the first portion of the passage, thereby substantially aligning the valve seat with the passage, before the valve seat is pressed into the second portion of the passage.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Now referring to the drawings, FIGS. 1–4 show the master cylinder of the first embodiment, which mainly comprises, as has already been described above, the cylinder body 2, the piston 3, the reservoir tank 5 and the center valve 20. A seal 7 is fitted around the piston 3 to permit liquid-tight sliding of the piston 3 in the cylinder body 2. The piston 3 has an intermediate small-diameter portion. Hydraulic fluid a flows through the port 4. A hole 3a that is elongated in the axial direction of the cylinder body 2 extends diametrically through the small-diameter portion of the piston 3. A pin 8 fixed to the cylinder body 2 is received in the elongated hole 3a, while kept in slide contact with the side walls of the elongated hole 3a so that the piston 3 can move axially without turning about its axis. The space 3b defined between the intermediate small-diameter portion of the piston 3 and the inner wall of the cylinder body 2 communicates with the reservoir tank 5 through a hole 5a formed in the cylinder body 2.

Figure 2:
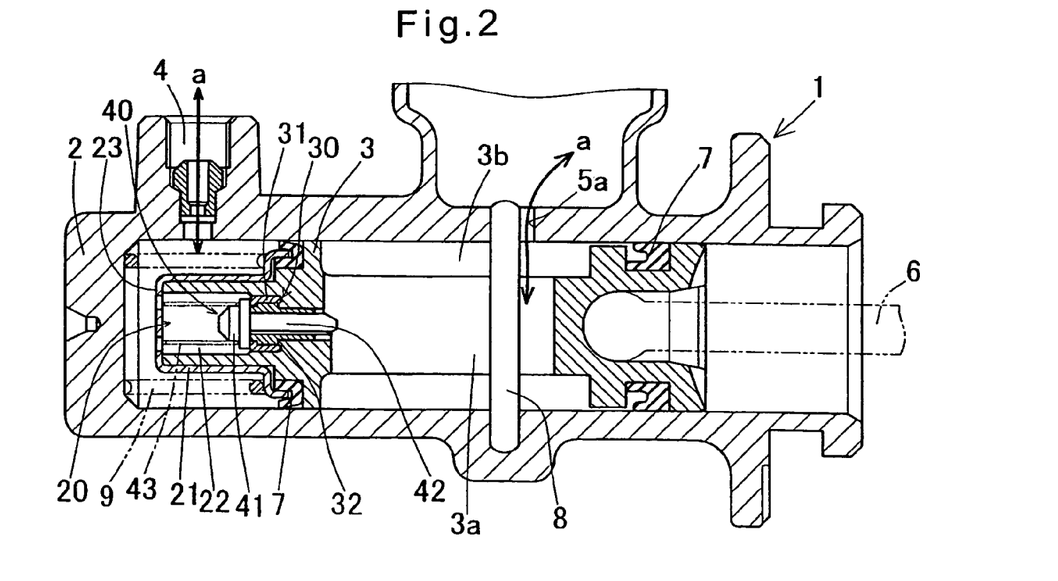
FIG. 2 is a view similar to FIG. 2, showing a different operational state.

A return spring 9 is mounted between the end wall of the cylinder body 2 and the front end of the piston 3. FIG. 1 shows the state while the brake pedal is not being depressed. When the brake pedal is depressed, the piston 3 is pushed by the brake pedal through the pushrod 6 and advances (moves leftwardly in the figures) as shown in FIG. 2. This closes the center valve 20 (we will explain how later). Hydraulic pressure is thus produced in the chamber defined in the cylinder body 2 between the end wall of the cylinder body and the center valve (this chamber is hereinafter referred to as the pressure chamber), and supplied to hydraulic units such as wheel brakes through the port 4. When the brake pedal is released, the return spring 9 will urge the piston 3 to move it backward from the position of FIG. 2 to the position of FIG. 1. This opens the center valve 20 (we will explain how later). Hydraulic oil in the pressure chamber is thus allowed to return to the reservoir tank 5 and the brake pressure disappears.

The center valve 20 includes a valve casing 21 which comprises a front end portion of the piston 3 and a cover 23 fitted on the front end portion of the piston 3. A valve seat 30 and a valve body member 40 are mounted in a passage 22 for hydraulic fluid a formed in the valve casing 21 so as to extend in the axial direction of the cylinder body 2. The passage 22 extends through the valve casing 21 and communicates with the elongated hole 3a formed in the piston 3. Thus, the pressure chamber of the master cylinder communicates with the space or gap 3b through the passage 22 and the elongated hole 3a.

The valve seat 30 is fitted in the passage 22 and comprises a collar 32 and an elastic tube 31 fitted on the collar 32. The tube 31 comprises a front end 31a adapted to be pressed against the rear end face 41a of a substantially truncated conical valve body 41 of the valve body member 40, and the remaining cylindrical portion 31b. The tube 31 is formed of a rubber and fixed to the collar 32 by vulcanization or casting. The passage 22 comprises a front (left-hand side in the figures) large-diameter portion 22a, an intermediate medium-diameter portion 22b and a rear small-diameter portion 3e.

The collar 32 has a small-diameter rear extension 34. The collar 32 is pressed into the medium-diameter portion 22b until the shoulder defined between the collar 32 and the extension 34 abuts the shoulder 22c of the passage 22 defined between the medium-diameter portion 22b and the small-diameter portion 3e with the extension 34 pressed in the small-diameter portion 3e of the passage 22. The rear extension 34 serves to stably support the collar 32 and thus the entire valve seat 30 so as to be in accurate alignment with the axis of the cylinder body 2 and also to prevent the valve seat 30 from being mounted in the wrong way, i.e. with the front end 31a of the elastic tube 31 located in the rear of the tube 31.

Preferably, the extension 34 has a greater (axial) length than the medium-diameter portion 22b of the passage 22 so that the extension 34 is inserted into the small-diameter portion 3e of the passage, thereby aligning the valve seat 30 with the axis of the passage 22, before the elastic tube 31 is pressed into the medium-diameter portion 22b of the passage 22. With this arrangement, since the valve seat 30 is aligned with the axis of the passage 22 before the tube 31 is pressed into the medium-diameter portion 22b of the passage 22, the tube 31 can be smoothly pressed into the medium-diameter portion 22b of the passage 22.

The valve body member 40 includes a shaft 42 slidably inserted in the collar 32 and the extension 34 of the valve seat 30 to extend in the axial direction of the passage 22. The shaft 42 carries the valve body 41 at its front end so as to be coaxial therewith. A valve spring 43 disposed between the valve body 41 and the cover 23 biases the valve body 41 toward the valve seat 30. The shaft 42 is formed with a groove 42a in its outer surface to extend the entire length thereof. When the valve 20 is open, hydraulic fluid a in the valve casing 21 can flow into the elongated hole 3a through the groove 42a or vice versa.

The front end 31a of the elastic tube 31 of the valve seat 30 slightly protrudes from the front end of the collar 32 so that when the valve body 41 and the valve seat 30 move close to each other, the valve body 41 first contacts the front end 31a of the tube 31. As the valve body 41 is further pressed against the valve seat 30, the elastic tube 31 is compressed until the rear end face 41a of the valve body 41 contacts the front end face 32a of the collar 32. In this state, the rear end face 41a of the valve body 41 is pressed against both the metallic front end face 32a of the collar 32 and the elastic front end 31a of the tube 31. The center valve 20 is thus completely closed.

Figure 3:
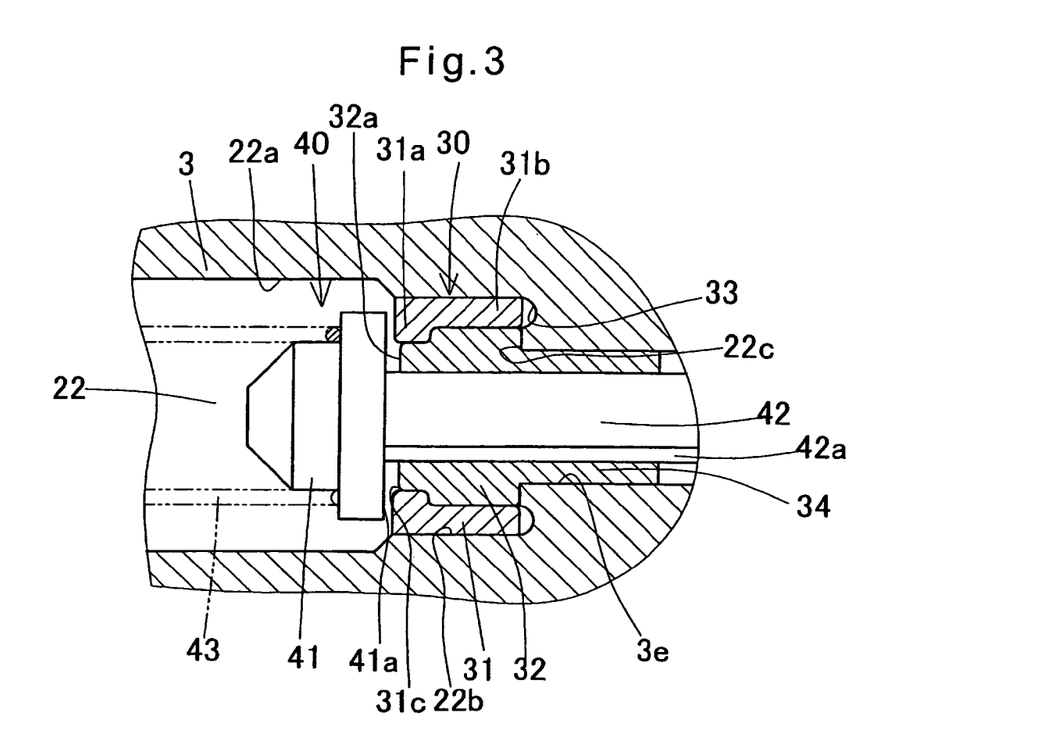
FIG. 3 is a partially cutaway front view of a portion of the center valve shown in FIG. 1.
Figure 4:
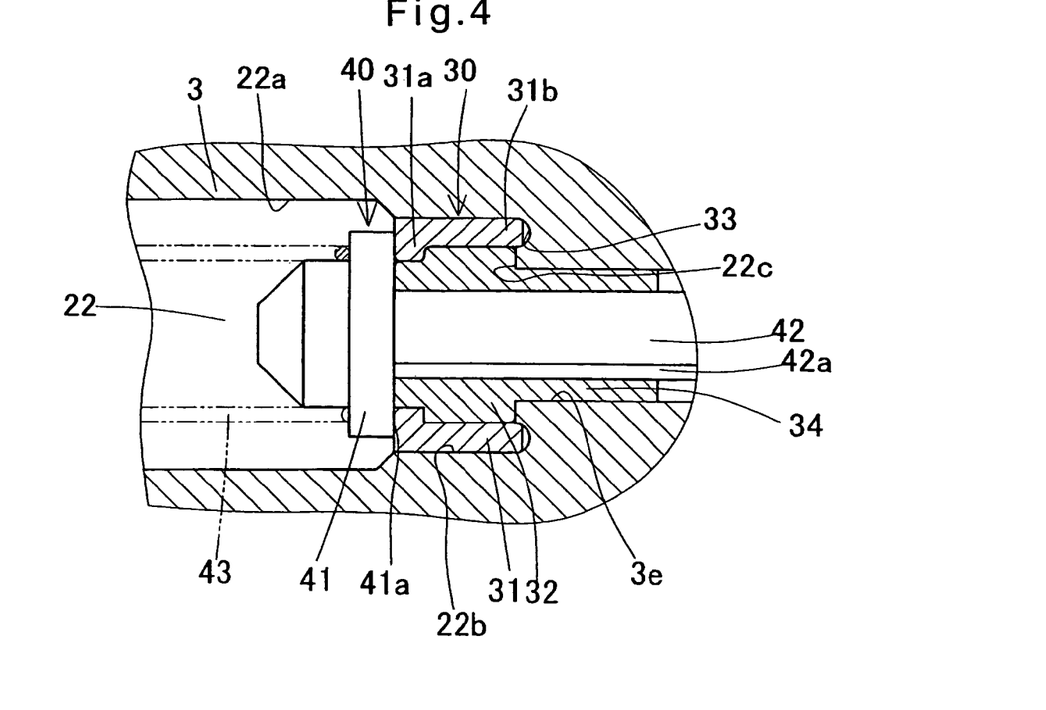
FIG. 4 is a view similar to FIG. 3, showing its different operational state.

In the shoulder 22c of the passage 22, an annular recess 33 is formed. When the elastic tube 31 is not stressed, the annular recess 33 substantially aligns with the cylindrical portion 31b of the elastic tube 31 as shown in FIG. 3. Thus, when the front end 31a of the tube 31 is pressed against the valve body 41, the front end 31a is scarcely deformed or compressed because the rear end of the cylindrical portion 31b absorbs the contact pressure by protruding into the annular recess 33 as shown in FIG. 4. When stress is applied to the elastic tube 31 due to a pressure difference between the pressure chamber and the space 3b, too, the front end 31a of the tube 31 is less likely to be deformed because the rear end of the cylindrical portion 31b is also deformed by protruding into the annular recess 33, and thus the stress is dispersed. This prevents the radially inner portion 31c of the front end 31a of the tube 31 from getting trapped between the metallic front surface 32a of the collar 32 and the rear end face 41a of the valve body 41.

Now in the operation of this embodiment, in the state of FIG. 1, in which the brake pedal is not depressed, the shaft 42 of the valve body member 40 is in abutment with the pin 8. The valve body member 40 is thus unable to move further rightwardly in the figure from this position. Also, the rear end face 41a of the valve body 41 is separate from the elastic tube 31 of the valve seat 30 as shown in FIG. 3. The center valve 20 is thus open. That is, hydraulic fluid a can flow between the pressure chamber and the reservoir tank 5 through the center valve 20.

When the brake pedal is depressed in this state, the piston 3 is advanced through the pushrod 6 as shown in FIG. 2. When the piston 3 begins to advance, only the valve seat 30 moves toward the valve body 41 with the valve body kept stationary by the valve spring 43. When the elastic tube 31 of the valve seat 30 abuts the valve body 41 as shown in FIG. 4, the center valve 20 closes. Thereafter, the valve body member 40 moves leftwardly together with the valve seat 30. When the center valve 20 closes, and the piston 3 further advances, hydraulic pressure is produced in the pressure chamber, and supplied to the hydraulic units such as wheel brakes. While the valve 20 is closed, the radially inner portion 31c of the front end 31a of the tube 31 is scarcely deformed due to the presence of the annular recess 33. Thus, this portion will never get torn.

When the brake pedal is released, the return spring 9 will push back the piston 3 from the position of FIG. 2 to the position of FIG. 1. The valve body member 40 also moves back together with the piston 3 until the rear end of the shaft 42 abuts the pin 8. After the shaft 42 has abutted the pin 8, the valve seat 30 will further move rightwardly away from the now stationary valve body 41. Now, hydraulic oil a can flow between the pressure chamber and the reservoir tank 5. If automatic brake control such as vehicle stability control (VSC) begins and the hydraulic pressure in the pressure chamber begins to rise, the elastic tube 31 will be elastically stretched due to the pressure difference between the pressure chamber and the space 3b until the front end 31a of the tube 31 is pressed against the valve body 41. But in this case, too, the front end 31a of the elastic tube 31 is less likely to be deformed because the rear end of the cylindrical portion 31b of the tube 31 is also deformed by protruding into the annular recess 33, and thus the stress applied to the tube 31 is dispersed. The front end 31a of the elastic tube 31 is thus less likely to get torn.

Figure 5:
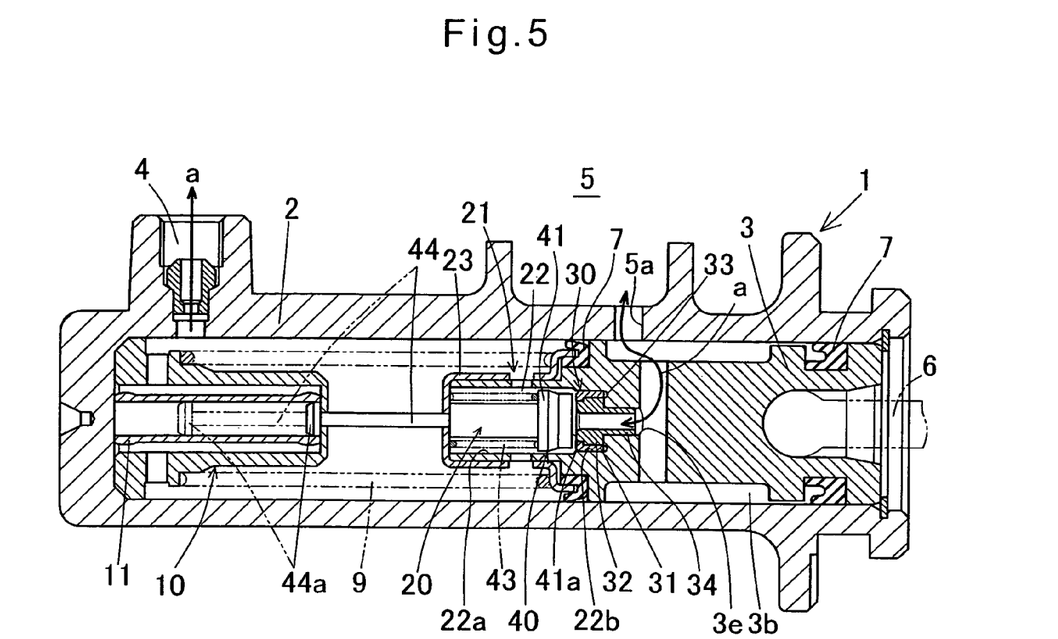
FIG. 5 is a front view in longitudinal section of a second embodiment according to the present invention.

FIG. 5 shows another embodiment, in which a retainer 10 is mounted on the inner surface of the end wall of the cylinder body 2. The valve body member 40 has a valve rod 44 extending axially leftwardly of FIG. 5 from the valve body 41. The valve rod 44 has a head 44a received in a guide member 11 of the retainer 10. The head 44a is guided in the guide member 11 so as to be movable in the axial direction of the cylinder body 2. Thus, the valve body member 40 is also movable in the axial direction of the cylinder body 2. At the rear (right-hand) end, the retainer 10 has an end wall adapted to engage the head 44a, thereby preventing the head 44a and thus the valve body 41 from further moving rightwardly from the position of FIG. 5 when the piston 3 is moving rigthtwardly. When the piston 3 moves further rightwardly after the head 44a has engaged the end wall of the retainer 10, the elastic tube 31 of the valve seat 30 will separate from the rear end face 41a of the valve body 41. The center valve 20 thus opens, and hydraulic fluid a can now freely flow between the pressure chamber and the reservoir tank 5 through the valve 20.

When the brake pedal is depressed in this state, the valve seat 30 first approaches the valve body 41, which is kept stationary by the valve spring 43. When the elastic tube 31 of the valve seat 30 abuts the valve body 41, the center valve 20 closes. When the piston 3 moves further leftwardly, the valve seat 30 and the valve body member 40 move together leftwardly with the head 44a guided by the guide member 11. Hydraulic pressure thus generated in the pressure chamber is supplied to hydraulic units.

In this embodiment, too, an annular recess 33 similar to the annular recess 33 of the first embodiment is formed in the shoulder 22c of the passage 22 to prevent the front end of the elastic tube 31 from getting torn while the center valve is being closed or when there exists a pressure difference between the pressure chamber and the space 3b with the center valve 20 open.

When the brake pedal is released in this state and the piston 3 is pushed back by the return spring 9, the head 44a of the rod 44 abuts the rear end wall of the retainer 10. When the piston 3 moves further rightwardly from this position, only the valve seat 30 moves back, separating from the now stationary valve body 41. The center valve 20 thus opens, so that hydraulic fluid a can freely flow between the pressure chamber and the reservoir tank 5 through the center valve 20.

Figure 6:
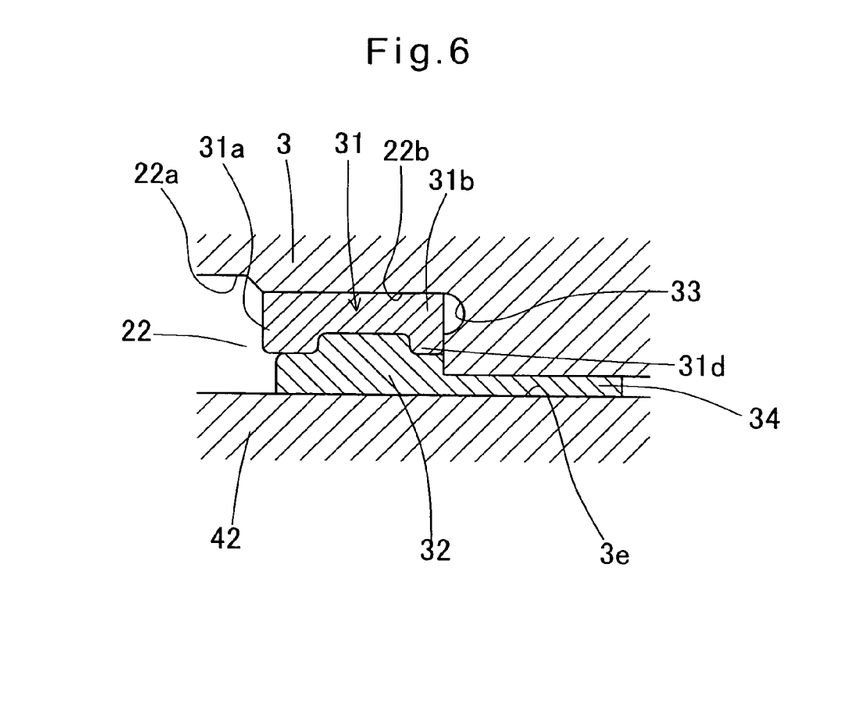
FIGS. 6, 7, 8A and 8B are partial sectional views of modified center valves.
Figure 7:
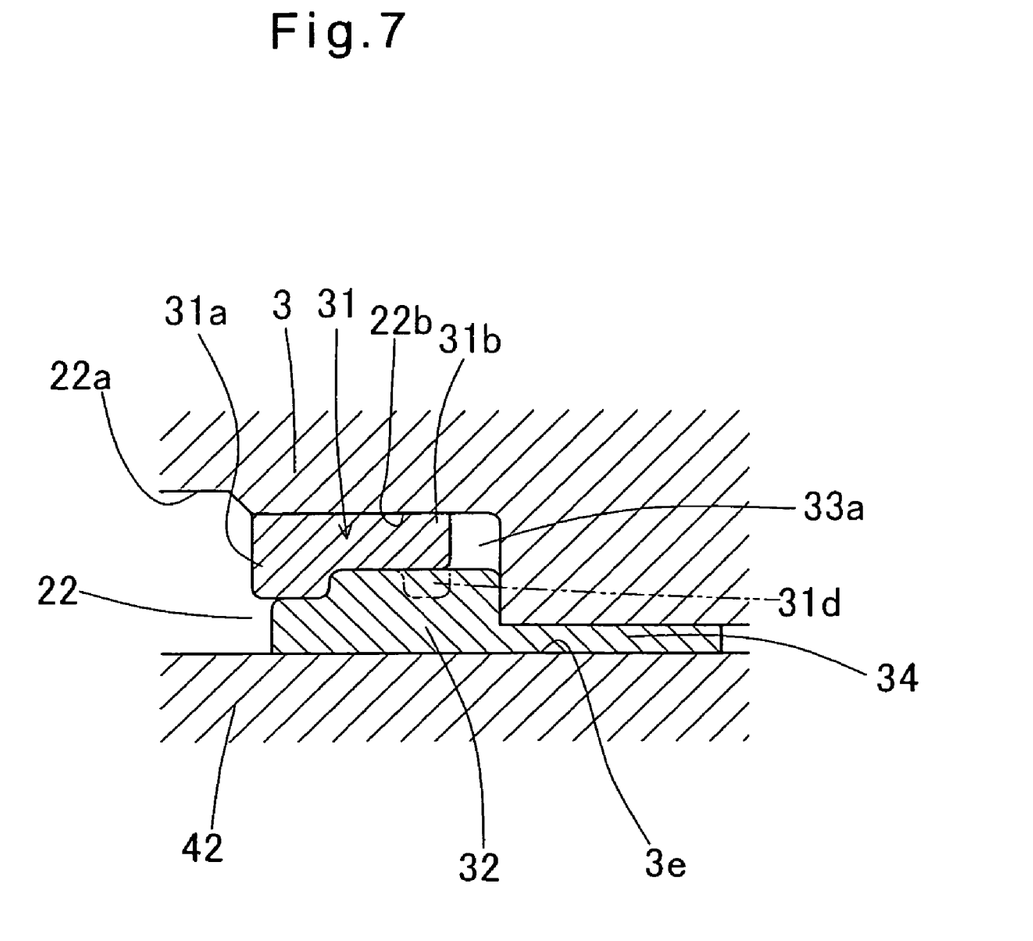

The elastic tube 31 of either of the first and second embodiments has the thick front end 31a and the relatively thin cylindrical portion 31b. Because the cylindrical portion 31b is relatively thin, it can be easily deformed and protrude into the annular recess 33. But as shown in FIG. 6, the cylindrical portion 31b may have at its rear end a radially inward protrusion 31d received in the collar 32. Instead of forming the annular recess 33, a gap 33a may be merely provided behind the rear end of the cylindrical portion 31b (FIG. 7) so that the rear end can protrude into the gap 33a when the elastic tube 31 is subjected to external stress. In the embodiment of FIG. 7, the cylindrical portion 31b of the elastic tube 31 may have at its rear end a radially inward protrusion 31d (shown by chain line) similar to the protrusion 31d of the embodiment of FIG. 6 and received in an annular groove formed in the collar 32.

Figures 8A, 8B:
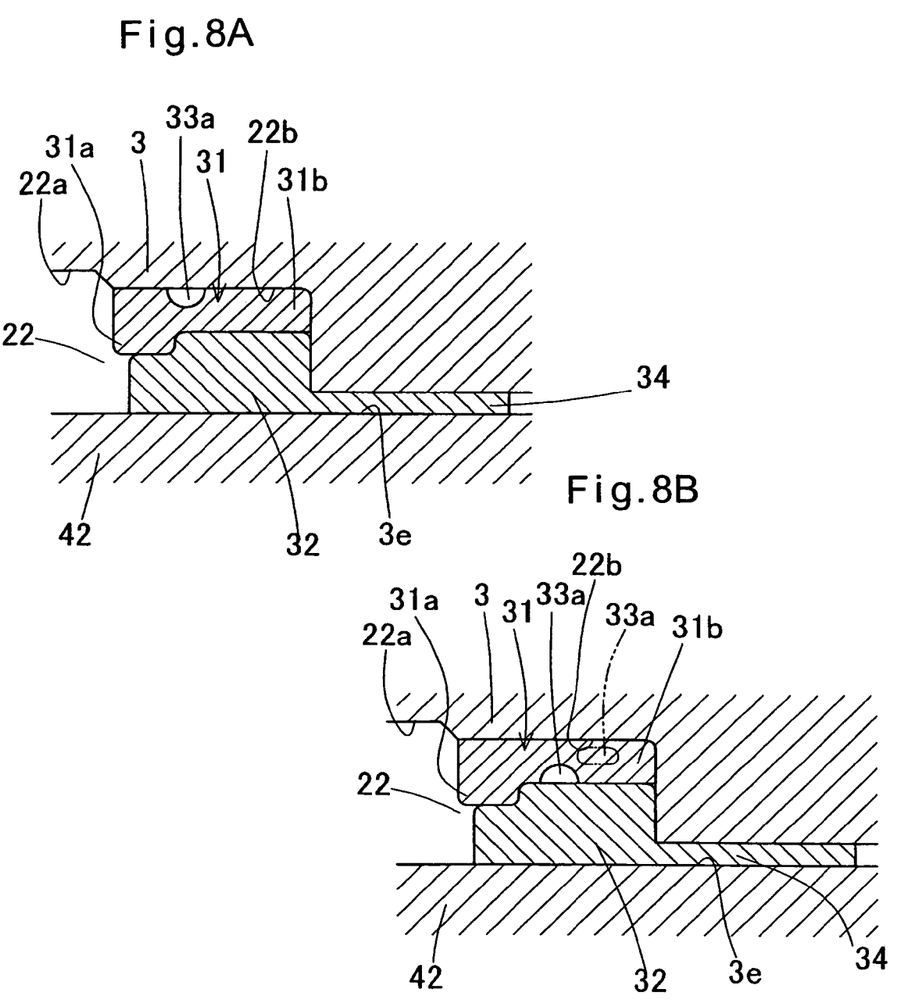

As shown in FIGS. 8A and 8B, such a gap 33a may be a recess formed in the cylindrical portion 31b of the elastic tube 31 itself. For example, such a recess is formed in the radially outer surface of the cylindrical portion 31b as shown in FIG. 8A, or in the radially inner surface of the cylindrical portion 31b as shown in FIG. 8B. Such a recess may also be a closed space formed in the cylindrical portion 31b as shown in phantom line in FIG. 8B.

Such a gap or recess is preferably an annular one. But it may instead comprise a plurality of gaps or recesses arranged circumferentially at predetermined intervals. Its (or their) axial dimension and axial position and the number thereof are not limited, provided such parameters do not have a bad influence on the expected function of the elastic tube 31. The gaps 33a and the recesses 33 of FIGS. 3, 7 and 8 may be used in combination.

The elastic tubes in the present invention and the conventional tube shown in FIG. 9 were actually used under equal conditions. The tube of FIG. 9 was torn soon. The tubes of the invention suffered no tear for a prolonged period of time.

What is claimed is:

1. A center valve for use in a master cylinder including a cylinder body having a closed front end, and a piston slidably inserted in said cylinder body, said center valve comprising a valve casing formed at a front end of said piston and formed with a passage through which hydraulic fluid can flow, a valve seat fitted in said passage, and a valve body mounted in said passage in front of said valve seat so as to be movable in an axial direction of said passage, said valve seat comprising a core member and an elastic tube fitted on said core member, said elastic tube comprising a front end portion adapted to be pressed against said valve body, and a rear cylindrical portion having an axis parallel to the axis of said passage, said valve body and said valve seat being movable toward and away from each other, said center valve being provided with a gap behind said cylindrical portion of said elastic tube, whereby when said valve body is pressed against said valve seat, said elastic tube is elastically deformed such that at least the rear end of said cylindrical portion protrudes into said gap.

2. The center valve of claim 1 wherein said valve seat carries an extension fitted in said passage so as to extend parallel to the axis of said passage, thereby holding said valve seat in position.

3. The center valve of claim 2 wherein said passage has a first portion in which said extension is received, and a second portion in which said valve seat is received, said extension having such a length that said extension is at least partially inserted in said first portion of said passage, thereby aligning said valve seat with said passage, before said valve seat is pressed into said second portion of said passage.

4. A center valve for use in a master cylinder including a cylinder body having a closed front end, and a piston slidably inserted in said cylinder body, said center valve comprising a valve casing formed at a front end of said piston and formed with a passage through which hydraulic fluid can flow, a valve seat fitted in said passage, and a valve body mounted in said passage in front of said valve seat so as to be movable in an axial direction of said passage, said valve seat comprising a core member and an elastic tube fitted on said core member, said elastic tube comprising a front end portion adapted to be pressed against said valve body, and a rear cylindrical portion having an axis parallel to the axis of said passage, said valve body and said valve seat being movable toward and away from each other, said cylindrical portion being formed with a gap, whereby when said valve body is pressed against said valve seat, said cylindrical portion is elastically deformed so as to fill at least a portion of said gap.

5. The center valve of claim 4 wherein said valve seat carries an extension fitted in said passage so as to extend parallel to the axis of said passage, thereby holding said valve seat in position.

6. The center valve of claim 5 wherein said passage has a first portion in which said extension is received, and a second portion in which said valve seat is received, said extension having such a length that said extension is at least partially inserted in said first portion of said passage, thereby substantially aligning said valve seat with said passage, before said valve seat is pressed into said second portion of said passage.

* * * * *